United States Patent
Barros et al.

(10) Patent No.: US 12,039,996 B2
(45) Date of Patent: Jul. 16, 2024

(54) DYNAMIC ADAPTATION OF GRAPHICAL USER INTERFACE ELEMENTS BY AN AUTOMATED ASSISTANT AS A USER ITERATIVELY PROVIDES A SPOKEN UTTERANCE, OR SEQUENCE OF SPOKEN UTTERANCES

(71) Applicant: GOOGLE LLC, Mountain View, CA (US)

(72) Inventors: Brett Barros, San Mateo, CA (US); Joanne J. Jang, Redwood City, CA (US); Andrew Schoneweis, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 317 days.

(21) Appl. No.: 17/532,199

(22) Filed: Nov. 22, 2021

(65) Prior Publication Data

US 2023/0035713 A1     Feb. 2, 2023

Related U.S. Application Data

(60) Provisional application No. 63/226,431, filed on Jul. 28, 2021.

(51) Int. Cl.
*G10L 21/10*     (2013.01)
*G06F 3/04817*     (2022.01)
(Continued)

(52) U.S. Cl.
CPC .......... *G10L 21/10* (2013.01); *G06F 3/04817* (2013.01); *G10L 15/1822* (2013.01);
(Continued)

(58) Field of Classification Search
CPC ..... G10L 21/10; G10L 15/1822; G10L 15/22; G10L 2015/223; G10L 2015/225;
(Continued)

(56) References Cited

U.S. PATENT DOCUMENTS

| 2011/0161079 | A1  | 6/2011  | Gruhn et al. |
| 2014/0362024 | A1* | 12/2014 | Hicks .................... G06F 1/1698 |
|              |     |         | 345/174 |

(Continued)

FOREIGN PATENT DOCUMENTS

| CN | 112015873 | 12/2020 |
| EP | 3783867   | 2/2021  |

OTHER PUBLICATIONS

European Patent Office; International Search Report and Written Opinion issued in Application No. PCT/US2021/061000; 13 pages; dated Apr. 7, 2022.

(Continued)

*Primary Examiner* — Michael N Opsasnick
(74) *Attorney, Agent, or Firm* — Gray Ice Higdon

(57) ABSTRACT

Implementations described herein relate to an automated assistant that iteratively renders various GUI elements as a user iteratively provides a spoken utterance, or sequence of spoken utterances, corresponding to a request directed to the automated assistant. These various GUI elements can be dynamically adapted as the user iteratively provides the spoken utterance to assist the user with efficiently completing the request. In some implementations, a generic container graphical element associated with candidate intent(s) can be initially rendered at a display interface of a computing device and dynamically adapted with tailored container graphical elements as a particular intent is determined while the user iteratively provides the spoken utterance. In additional or alternative implementations, the tailored container graphical elements can include a current status of one or (Continued)

more settings associated with the computing device or additional computing device(s) such that the user can view the current status while completing the spoken utterance.

20 Claims, 10 Drawing Sheets

(51) Int. Cl.
  *G10L 15/18* (2013.01)
  *G10L 15/22* (2006.01)
(52) U.S. Cl.
  CPC ........ *G10L 15/22* (2013.01); *G10L 2015/223* (2013.01); *G10L 2015/225* (2013.01); *G10L 2015/227* (2013.01)
(58) Field of Classification Search
  CPC ........... G10L 2015/227; G06F 3/04817; G06F 3/0482; G06F 3/167; G06F 3/0484
  See application file for complete search history.

(56) References Cited

U.S. PATENT DOCUMENTS

| | | | |
|---|---|---|---|
| 2018/0166074 A1* | 6/2018 | Aggarwal | G10L 15/08 |
| 2018/0285070 A1* | 10/2018 | Yoon | G10L 15/22 |
| 2018/0350353 A1* | 12/2018 | Gruber | G10L 15/26 |
| 2019/0027138 A1* | 1/2019 | Wang | G10L 15/22 |
| 2019/0080683 A1 | 3/2019 | Qian et al. | |
| 2019/0130899 A1 | 5/2019 | Aravamudan et al. | |
| 2019/0196779 A1* | 6/2019 | Declerck | G10L 15/08 |
| 2019/0361575 A1* | 11/2019 | Ni | H04L 67/535 |
| 2020/0380973 A1* | 12/2020 | Novitchenko | G06F 40/35 |

OTHER PUBLICATIONS

European Patent Office; Examination Report issued for Application No. 21835016.3, 8 pages, dated Jan. 31, 2024.

* cited by examiner

DYNAMIC ADAPTATION OF GRAPHICAL USER INTERFACE ELEMENTS BY AN AUTOMATED ASSISTANT AS A USER ITERATIVELY PROVIDES A SPOKEN UTTERANCE, OR SEQUENCE OF SPOKEN UTTERANCES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In many instances, an automated assistant may be invoked by a user who may not have a complete command phrase in mind. For example, assume that a user provides a spoken utterance of "Assistant, set . . . " that includes a portion of a request for the automated assistant to act upon. In this example, the portion of the request may indicate that the user intends to set a volume for smart speaker(s), set a temperature for a smart thermostat, set a brightness level for smart light bulb(s), etc. However, in many of these instances, if the user does not articulate the complete command phrase within a certain window of time, the automated assistant may not act upon the request because it is too ambiguous or the automated assistant may act upon the request and perform some action that was not intended by the user. Accordingly, the user may need to re-invoke the automated assistant and provide the spoken utterance again with the complete command phrase, thereby prolonging one or more dialog sessions between the user and the automated assistant and increasing a quantity of user inputs that are received at the computing device.

In some instances, an automated assistant may be invoked by a user who may have a complete command phrase in mind, but may not have a particular slot value associated with the command phrase in mind. For example, assume that a user provides a spoken utterance of "Assistant, set the volume to . . . " that includes a portion of a request for the automated assistant to act upon. In this example, the portion of the request may indicate that the user intends to set a volume for speaker(s) as the particular slot value associated with the command to set the volume for the speaker(s). However, in many of these instances, the user may not know the current state of the volume of the speaker(s), and, as a result, may not know how to modify the volume of the speaker(s) relative to the current status. Accordingly, the user may pause to think about how to modify the volume of the speaker(s) after providing the initial portion of the spoken utterance (e.g., "Assistant, set the volume to . . . "). Similar to the above example, if the user does not articulate the particular slot value within a certain window of time, the automated assistant may not act upon the request because it is too ambiguous or the automated assistant may act upon the request and perform some action that was not intended by the user. Again, the user may need to re-invoke the automated assistant and provide the spoken utterance again with the complete command phrase and the particular slot value, thereby prolonging one or more dialog sessions between the user and the automated assistant and increasing a quantity of user inputs that are received at the computing device. As a result, computational resources may be wasted in these examples by processing of incomplete spoken utterances and requiring the user to re-engage in the dialog session with the automated assistant.

SUMMARY

Implementations described herein relate to an automated assistant that can dynamically adapt graphical user interface (GUI) elements based on a user iteratively providing a spoken utterance, or a sequence of spoken utterances, that includes a request directed to the automated assistant executing at least in part at a computing device of the user. The GUI elements can characterize portions of the incoming request from the user and/or provide suggestions that can assist the user with more efficiently and accurately describing the request to the automated assistant. In some implementations, and based on processing the portion of the request, candidate intent(s) can be determined and a generic container graphical element associated with the candidate intent(s) can be rendered at a display interface of the computing device prior to the user completing the request. Further, and based on processing an additional portion of the request, a particular intent can be determined, from the candidate intent(s), and the generic container graphical element can be dynamically adapted with a particular tailored container graphical element associated with the particular intent and without rendering a different display interface at the computing device. In additional or alternative implementations, a particular word or phrase included in the portion of the request can be mapped directly to the generic container graphical element without having to determine the candidate intent(s). In additional or alternative implementations, the particular tailored container graphical element can include a current state of one or more settings (e.g., a slot value associated with the current state of the one or more settings) of the computing device and/or additional computing device(s) in communication with the computing device in response to determining that the portion of the request is associated with modifying the current state of the one or more settings of the computing device and/or additional computing device(s).

For example, assume the user begins providing a spoken utterance of "Assistant, set . . . " that includes a portion of a request for the automated to adjust a state of a device, such as a volume for smart speaker(s), a temperature for a smart thermostat, set a brightness level for smart light bulb(s), etc. As the user provides the portion of the request, the automated assistant can cause a stream of audio data capturing the portion of the request to be processed, using a streaming automatic speech recognition (ASR) model, to generate ASR output. Further, the automated assistant can cause the ASR output to be processed, using a natural language understanding (NLU) model, to generate NLU output. The generic container graphical element can be rendered at the display interface of the computing device based on the ASR output (e.g., indicating that the portion of the request includes "set" or another particular word or phrase) and/or the NLU output (e.g., indicating that the portion of the request includes the candidate intent(s) associated with the generic container graphical element).

Further assume the user continues providing the spoken utterance of " . . . the volume for the speakers . . . " (or as an additional spoken utterance that follows the spoken utterance) that includes an additional portion of the request for the automated to adjust the state of the device. Similarly, as the user provides the additional portion of the request, the automated assistant can cause the stream of audio data that also captures the additional portion of the request to be processed, using the streaming ASR model, to generate additional ASR output. Further, the automated assistant can cause the additional ASR output to be processed, using the NLU model, to generate additional NLU output. Based on the additional ASR output and/or the additional NLU output, the automated assistant can determine that the user wants to set the volume for the smart speaker(s). Accordingly, the generic container graphical element can be dynamically adapted with a tailored container graphical element that is specific to setting the volume for the smart speakers(s). For instance, the tailored container graphical element that is specific to setting the volume for the smart speaker(s) can include a current state of the volume for the smart speaker(s), volume control graphical element(s) that enable the user to set the volume using touch input, media content that indicates the volume is being set for the smart speaker(s), device identifier(s) associated with the smart speaker(s), and/or any other content associated with the smart speaker(s).

In contrast, in continuing providing of the spoken utterance, had the user indicate " . . . the temperature . . . ", the generic container graphical element can be dynamically adapted with a tailored container graphical element that is specific to setting the temperature for a smart thermostat that is distinct from the tailored container graphical element that is specific to setting the volume for the smart speaker(s). For instance, the tailored container graphical element that is specific to setting the temperature for the smart thermostat can include a current state of the temperature, media content that indicates the temperature is being set for the smart thermostat, temperature control graphical element(s) that enable the user to set the temperature using touch input, a device identifier associated with the smart thermostat, and/or any other content associated with the smart thermostat. Nonetheless, in either of these instances, the same generic container graphical element can be dynamically adapted to these various tailored container graphical elements without rendering any additional user interfaces.

The generic container graphical element can operate as a placeholder for any one of multiple disparate tailored container graphical elements that are each associated with a corresponding one of multiple disparate intents or that is mapped directly to particular words or phrases. Accordingly, as the user continues to provide the request to the automated assistant, the generic container graphical element can dynamically and seamlessly be adapted with the particular tailored graphical element that is associated with the particular intent determined based on processing the additional portion of the request. For instance, in the above examples, the generic container graphical element can be initially rendered at the display interface in response to the portion of the request of "Assistant, set . . . ". The generic container graphical element can include, for example, an array of graphical elements (e.g., an array of dot shapes) to indicate a range of values. Subsequently, when the user provides an additional portion of the request (e.g., " . . . the volume of the speakers . . . ", " . . . the brightness . . . ", " . . . the temperature . . . ", etc.), the automated assistant can adapt the array of graphical elements based on the additional portion of the request. For instance, based on the user providing the additional portion of the request of " . . . the volume of the speakers . . . ", the array of graphical element can be adapted to reflect a range of values associated with the volume of the smart speaker(s) and include the current state of the volume of the smart speaker(s) to aid the user in determining how to modify the volume. Also, for instance, based on the user providing the additional portion of the request of " . . . the brightness . . . ", the array of graphical element can be adapted to reflect a range of values associated with the brightness of smart light bulb(s) and include the current state of the brightness of the smart light bulb(s) to aid the user in determining how to modify the brightness.

In some implementations, the automated assistant can process the candidate intent(s) to identify a particular device and/or application the user may be attempting to control in providing the request. When the automated assistant identifies the particular device and/or application, the automated assistant can cause the array of graphical elements in the generic container graphical element to represent the current state of that particular application and/or device, resulting in the tailored container graphical element. For example, the array of graphical elements can include seven filled-in circles followed by three empty circles, thereby indicating that smart light bulb(s) associated with the particular device and/or application is currently at 70% of a maximum brightness level as the current state of a brightness setting of the smart light bulb(s). Alternatively, or additionally, the automated assistant can identify an icon that represents the particular device and/or application (e.g., an icon representing kitchen lights) that the user is predicted to be referring to. The automated assistant can include the icon to the tailored container graphical element to identify a particular device and/or application that the automated assistant has selected to control in response to the request from the user. In this way, the user can elect to bypass providing another portion of the request via spoken utterances for specifying the particular application and/or device (e.g., to change the brightness from 70% to 50%) and utilize touch input instead, thereby preserving computational resources such as those that would otherwise be consumed when processing the spoken utterance or additional spoken utterance(s).

In some implementations, the user can cause the automated assistant to control the particular device and/or application by completing the request via one or more additional spoken utterances and based on witnessing the current state indicated by the array of graphical elements included in the tailored container graphical element. For example, by witnessing the array of graphical elements included in the tailored container graphical element, the user can consider a final portion of their request. The user can provide a final spoken utterance such as, " . . . to 30%," thereby directing the automated assistant to control the particular device and/or application to adjust the brightness level from 70% to 30%. Alternatively, or additionally, the user can tap a portion of the array of graphical elements corresponding to the "30% dot" to cause the automated assistant to similarly adjust the brightness level from 70% to 30%.

In some implementations, the automated assistant can cause multiple tailored container elements to be rendered in response to an initial portion of a request being provided by a user. For instance, when the user provides an initial portion of a request via a spoken utterance such as, "Assistant, play [song title 1] by . . . ," the automated assistant can cause multiple different tailored container elements to be rendered at the display interface of the computing device. Each of the tailored container graphical elements can correspond to a different operation and/or interpretation that can be associated with the request. For example, a first tailored container graphical element can correspond to an operation for playing "[song title 1]" by "[artist 1]" at the computing device or an additional computing device, and a second tailored container graphical element can correspond to another operation for playing for playing "[song title 1]", but by "[artist 2]" at the computing device or the additional computing device. In some implementations, each of the tailored container graphical elements additionally or alternatively include a current state the computing device or the additional computing device (e.g., what is currently playing at the first device and/or the second device). The user can complete the request (e.g., via spoken utterance(s) and/or touch input), and the automated assistant can cause the request to be fulfilled accordingly.

In some implementations, the ASR output generated using the streaming ASR model can include, for example, predicted speech hypotheses that are predicted to correspond to various portions of the request, predicted phonemes that are predicted to correspond to various portions of the request, predicted ASR measures that are indicative of how likely the predicted speech hypotheses and/or the predicted phonemes correspond to various portions of the request, and/or other ASR output. Further, the NLU output generated using the NLU model can include, for example, the candidate intent(s) that are predicted to correspond to an actual intent of the user in providing the various portions of the request, one or more slot values for corresponding parameters associated with the candidate intent(s), and/or other NLU output. Moreover, one or more structured requests can be generated based on the NLU output, and processed by various device(s) and/or application(s) to generate fulfillment data for the request. The fulfillment data, when implemented, can cause the automated assistant to fulfill the request provided by the user.

In some implementations, the generic container graphical element(s) and/or the tailored container graphical element(s) described herein may only be rendered at the display interface of the computing device in response to determining that the user has paused in providing of the request. The automated assistant can determine that the user has paused in providing of the request based on, for example, the NLU data and/or audio-based characteristics associated with the portion(s) of the request that are received at the computing device. The audio-based characteristics associated with the portion(s) of the request can include one or more of: intonation, tone, stress, rhythm, tempo, pitch, and elongated syllables. For instance, assume a user provides a request of "Assistant, set the volume to . . . " that is included in a spoken utterance directed to the automated assistant. In this example, the automated assistant can determine that the user has paused based on, for example, a threshold duration of time lapsing since the said "to" and the NLU output indicating that the user has not provided a slot value for a volume parameter associated with a predicted intent of changing the volume of smart speaker(s). In response, the automated assistant can cause a volume container graphical element for the smart speaker(s) to be rendered at the display interface of the computing device. The volume container graphical element for the smart speaker(s) that is rendered at the display interface of the computing device can include a current volume of the smart speaker(s) to help aid the user in determining how to modify the volume relative to the current volume. Alternatively, or additionally, further assume the user includes an elongated syllable in providing "to" (e.g., "Assistant, set the volume toooooo . . . "). In this example, the automated assistant can determine that the user has paused based on, for example, the audio-based characteristics reflecting an uncertainty with respect to how to modify the volume relative to the current volume based on at least the elongated syllables in providing of the request. Accordingly, the volume container graphical element can help aid the user in determining how to modify the volume relative to the current volume.

By using techniques described herein, various technical advantages can be achieved. As one non-limiting example, techniques described herein enable an automated assistant to dynamically adapt various GUI elements from generic GUI elements to tailored GUI elements while the user provides a spoken utterance or a sequence of spoken utterances. For example, the user can provide a spoken utterance that includes a portion of a request, and the automated assistant can render generic GUI element(s) that are subsequently adapted with tailored GUI element(s) based on processing additional portion(s) of the spoken utterance or additional spoken utterance(s). These tailored GUI element(s) can aid the user in completing the request, thereby causing a dialog session between the user and the automated assistant to be concluded in a more quick and efficient manner and a quantity of user inputs received at the computing device can be reduced. Further, instances where the automated assistant fails due to the user not completing the request within a certain window of time can be mitigated. As a result, computational resources at the computing device can be conserved and latency in fulfilling the request can be reduced.

The above description is provided as an overview of some implementations of the present disclosure. Further description of those implementations, and other implementations, are described in more detail below.

DETAILED DESCRIPTION

Figure 1A:
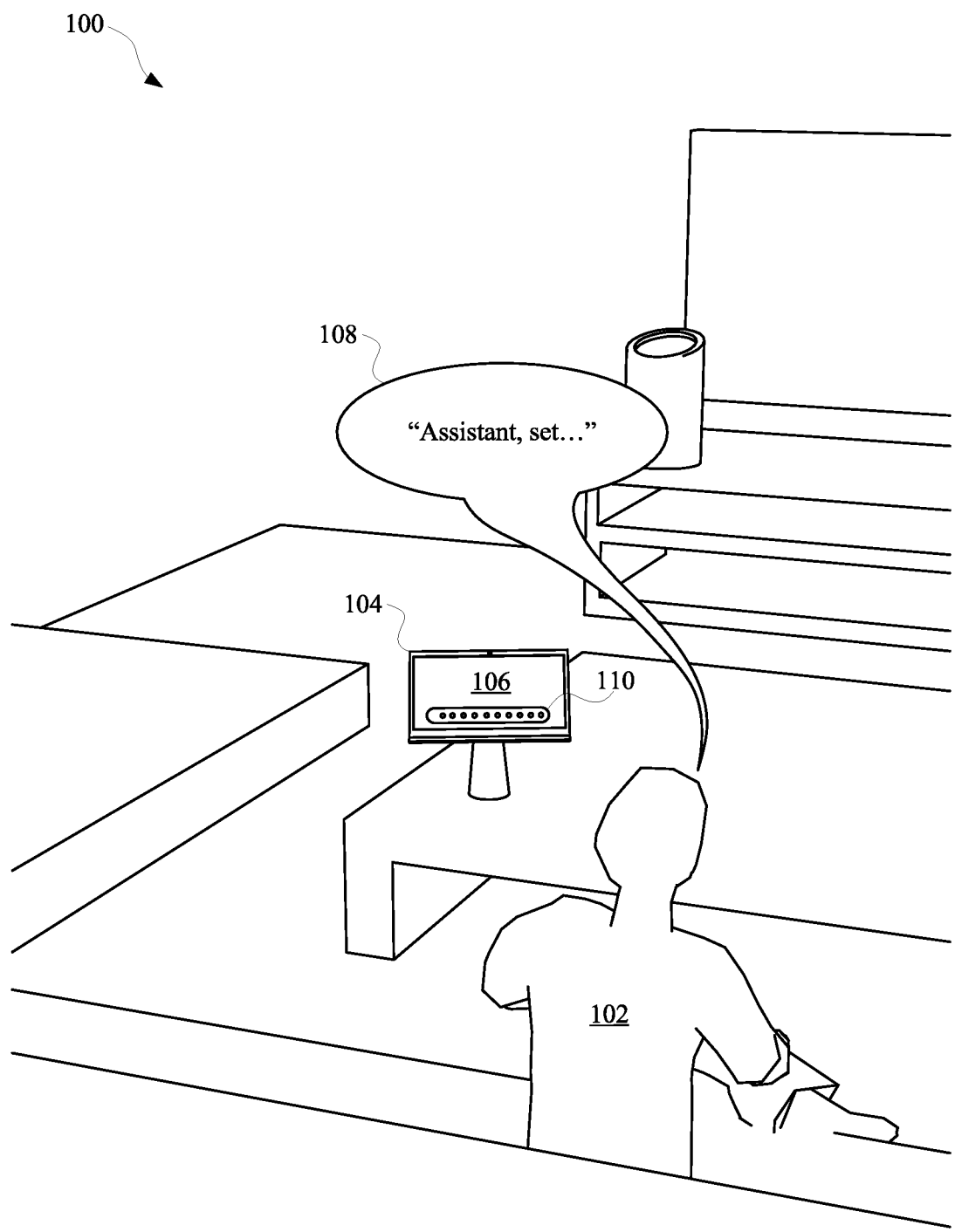
FIG. 1A, FIG. 1B, and FIG. 1C illustrate views of a user iteratively providing an example request to an automated assistant that iteratively renders graphical elements corresponding to portions of the example request, in accordance with various implementations.
Figure 1B:
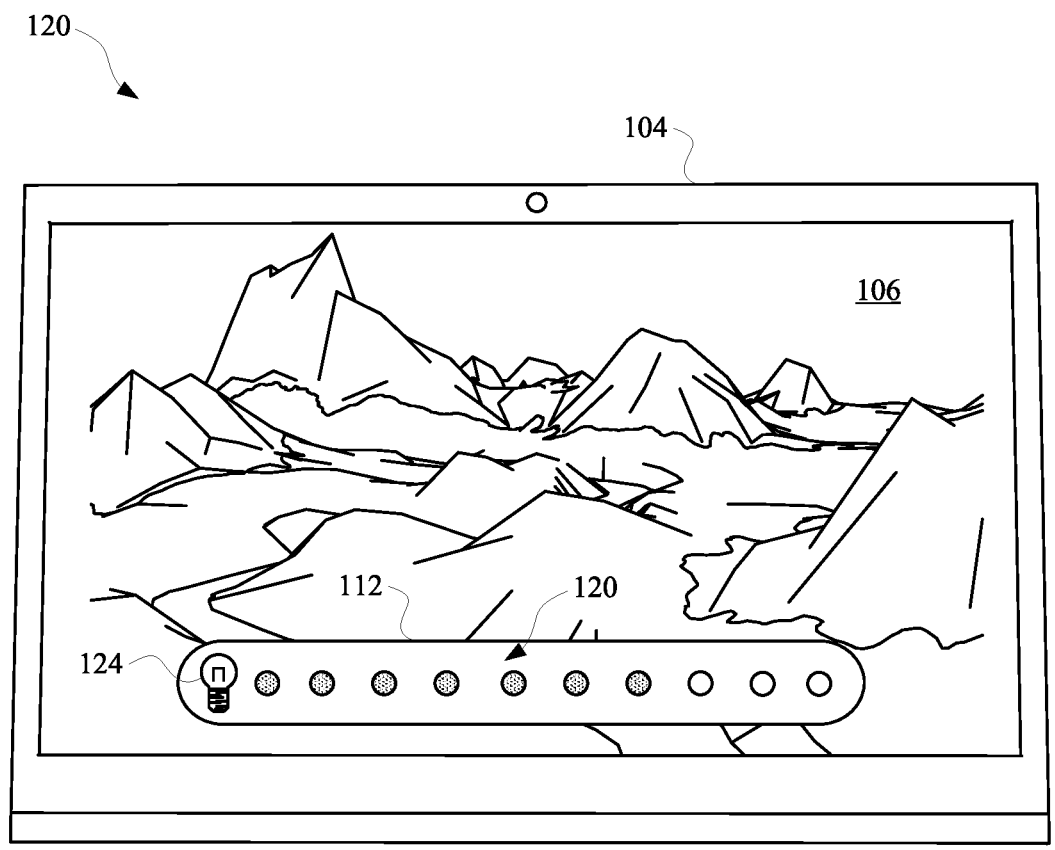
Figure 1C:
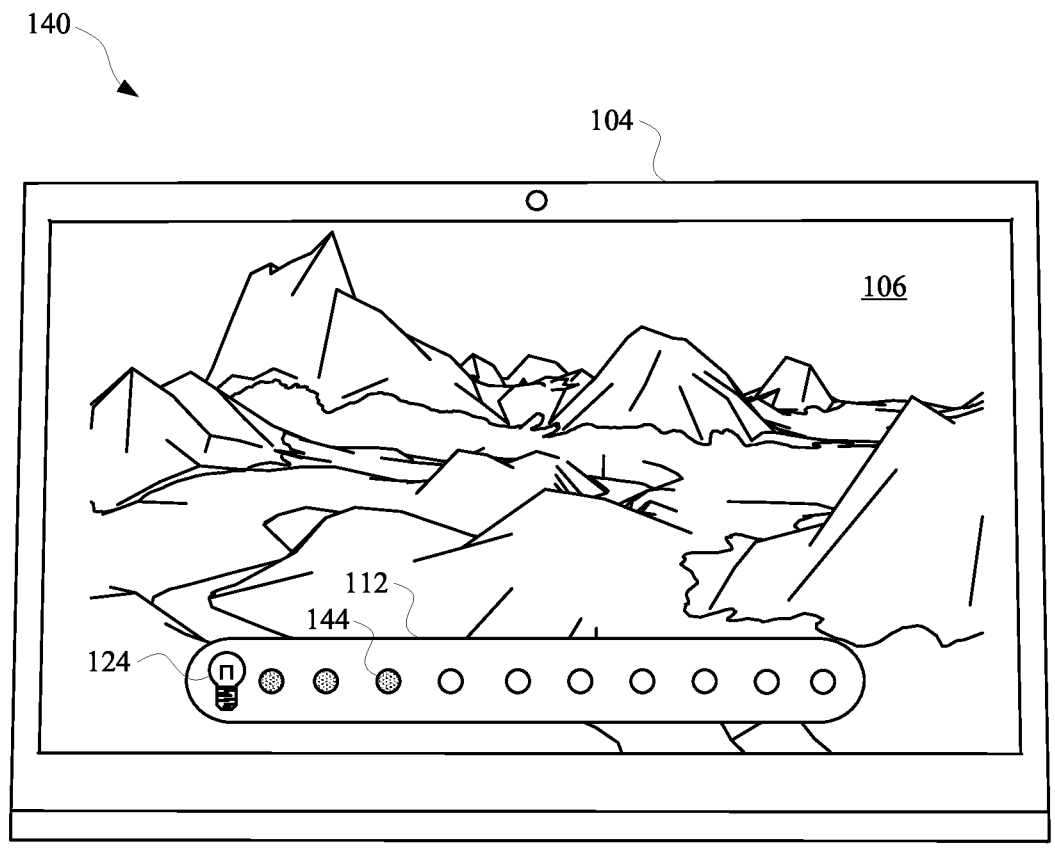

FIG. 1A, FIG. 1B, and FIG. 1C illustrate a view 100, a view 120, and a view 140, respectively, of a user 102 iteratively providing an example request to an automated assistant that iteratively renders graphical elements corresponding to portions of the example request. The request can be included in a spoken utterance that is directed to the automated assistant, or a sequence of spoken utterances that are directed to the automated assistant. For instance, in the example of FIG. 1A, assume the user 102 provides a spoken utterance of "Assistant, set . . . " that includes a first portion of a request 108 directed to the automated assistant that is accessible via a computing device 104 in a home of a user. The user 102 can provide the spoken utterance in furtherance of causing the automated assistant to perform a particular assistant action and/or execute a particular intent associated with the first portion of the request 108. The automated assistant can cause a stream of audio data capturing the first portion of the request 108 to be processed, using a streaming automatic speech recognition (ASR) model, to generate ASR output. Further, the automated assistant can cause the ASR output to be processed, using a natural language understanding (NLU) model, to generate NLU output. Notably, these operations can be performed while the user 102 is providing the spoken utterance that includes the first portion of the request 108.

In some implementations, the automated assistant can determine, based on processing the first portion of the request 108, candidate intent(s) associated with the first portion of the request 108 based on the NLU output. Further, the automated assistant can determine, based on the candidate intent(s), a generic container graphical element 110 to be rendered at a display interface 106 of the computing device 104. For example, the generic container graphical element 110 can be selected to represent a graphical user interface (GUI) element that can be dynamically adapted with a particular tailored container graphical element that is associated with a particular intent selected, from among the candidate intent(s), based on processing additional portions of the request (e.g., as shown in FIGS. 1A and 1B). In additional or alternative implementations, the automated assistant can determine, based on the ASR output (and without considering the NLU output) indicating the first portion of the request includes a particular word or phrase (e.g., "set"). For example, the particular word or phrase can be mapped to the generic container graphical element 110 in on-device memory of the computing device 104 such that when the particular word or phrase is detected in the ASR output, the generic container graphical element 110 can be rendered at the display interface 106 of the computing device 104. The generic container graphical element 110 can be similarly dynamically adapted with a particular tailored container graphical element that is associated with a particular intent based on processing additional portions of the request (e.g., as shown in FIGS. 1B and 1C). Put another way, the generic container graphical element 110 can be rendered at the display interface 106 of the computing device 104 because the first portion of the request 108 is predicted to correspond to a request for controlling an application and/or device with a "setting" (e.g., based on the first portion of the request 108 including the word "set", "change", and/or other particular words or phrases) that can be represented by an array of graphical elements (e.g., an array of empty or filled-in circles as shown in FIG. 1A).

In some implementations, the generic container graphical element 110 can be rendered at the display interface 106 of the computing device 104 in response to determining that the user 102 has paused in providing of the spoken utterance that includes the first portion of the request 108. The automated assistant can determine that the user 102 has paused in providing the spoken utterance that includes the first portion of the request 108 based on, for example, the NLU output generated in processing the spoken utterance, audio-based characteristics determined based on processing the spoken utterance, and/or a threshold duration of time lapsing since the user 102 provided the first portion of the request 108. For example, the automated assistant may determine that the user 102 has paused in providing of the spoken utterance based on a threshold duration of time lapsing since the user 102 provided the first portion of the request 108, and based on the NLU output indicating slot value(s) for corresponding parameter(s) associated with the candidate intent(s) are unknown (e.g., the user 102 said "set", but failed to provide any indication of what is to be "set"). In some versions of those implementations, the automated assistant may also consider one or more terms or phrases that surround the predicted pause (e.g., whether the pause occurs after a preposition or a speech disfluency (e.g., uhmmm, uhhh, etc.)). Alternatively, or additionally, the audio-based characteristics can indicate a manner in which the user 102 provided the first portion of the request 108 indicates that the user 102 has paused to consider how to phrase the natural language that will be provided to the automated assistant to complete the request.

Further assume that the user 102 continues providing of the spoken utterance or provides an additional spoken utterance that includes a second portion of the request 122 by providing " . . . the lights . . . " as illustrated in view 120 of FIG. 1B, in furtherance of providing a complete request to the automated assistant. In this example, the stream of audio data capturing the second portion of the request 122 can be processed to generate additional ASR output and additional NLU output. Based on the additional NLU output, the automated assistant can select a particular intent, from among the candidate intent(s) described with respect to FIG. 1A, that indicates to the automated assistant that the user 102 would like to modify a current state of smart light bulb(s) in the home of the user 102. Accordingly, in response to receiving the second portion of the request 122, the automated assistant can dynamically adapt the generic container graphical element 110 of FIG. 1A with content associated with the particular intent determined based on processing the second portion of the request 122, resulting in a particular tailored graphical container element 112 in a seamless manner.

The particular tailored graphical container element 112 can be one of multiple disparate tailored graphical container elements for which the generic graphical container element 110 can be dynamically adapted, and can be specific to the particular intent that is selected based on processing the second portion of the request 122. Put another way, the particular tailored graphical container element 112 shown in FIG. 1B can be specific to the particular intent associated with modifying the current state of the smart light bulb(s), and other intents can be associated with tailored graphical container elements (e.g., a modifying a temperature intent, a modifying a speaker volume intent, etc.) that differ from the particular tailored graphical container element 112 shown in FIG. 1B. The particular tailored graphical container element 112 can include, for example, media content 124 that indicates a device and/or application that the automated assistant may associate with the second portion of the request 122 (e.g., the light bulb icon depicted in FIG. 1B), a current state 120 that indicates current state of a device and/or application that the automated assistant may associate with the second portion of the request 122 (e.g., the seven filled-in circles depicted in FIG. 1B to indicate the smart light bulb(s) are at 70% brightness) and that is dynamically adapted from the array of graphical elements shown with respect to the generic container graphical element 110 in FIG. 1A, one or more control elements 144 that, when selected via touch input of the user 102, cause the current state 120 of the device and/or application to be controlled (e.g., as described with respect to FIG. 1C), device identifier (s) associated with various smart light bulb(s) to be controlled, and/or other content. Notably, because the generic container graphical element 110 is dynamically adapted with the particular tailored container graphical element 112 as the user 102 provides the request, the particular tailored container graphical element 112 can be rendered at the display interface 106 of the computing device 104 before the user 102 completes the request and/or before the automated assistant completes fulfillment of the request.

In contrast with the example shown in FIG. 1B, assume that the user 102 continues providing of the spoken utterance or provides an additional spoken utterance that includes a second portion of the request 122, such as " . . . the volume of the speakers . . . ". In this example, the second portion of the request 122 can be processed in the same or similar manner as described above. However, the resulting particular tailored container graphical element will differ from the particular tailored container graphical element 112 shown in FIG. 1B. For example, the particular tailored graphical container element in this contrasting example can include, for example, media content that indicates a device and/or application that the automated assistant may associate with the second portion of the request 122 (e.g., a speaker icon), a current state that indicates current state of a device and/or application that the automated assistant may associate with the second portion of the request 122 (e.g., the filled-in circles can correspond to a speaker volume level) and that is dynamically adapted from the array of graphical elements shown with respect to the generic container graphical element 110 in FIG. 1A, one or more control elements that, when selected via touch input of the user 102, cause the current state of the device and/or application to be controlled, and/or other content. Accordingly, the same generic container graphical element 110 shown in FIG. 1B can be adapted differently based on the second portion of the request 122.

Further assume that the user 102 completes providing of the spoken utterance, the additional spoken utterance, or provides a further additional spoken utterance that includes a third portion of the request 142 by providing " . . . to 30 percent" as illustrated in view 140 of FIG. 1C, in furtherance of providing a complete request to the automated assistant. In this example, the stream of audio data capturing the third portion of the request 142 can be processed to generate further additional ASR output and further additional NLU output. Based on the further additional NLU output, the automated assistant can generate a structured request to be utilized in fulfilling the spoken utterance(s) of the user 102. For example, the automated assistant can transmit the one or more structured requests to the smart light bulb(s) and/or an application associated with the smart light bulb(s) that is accessible at the computing device 104 to cause the current state 122 of the smart light bulb(s) to be modified from 70% brightness to 30% brightness in response to receiving the third portion of the request 142 from the user 102. Further, in response to receiving the third portion of the request 142, the automated assistant can reflect the change in the brightness of the smart light bulb(s) by adapting the current state 122 to reflect the smart light bulb(s) have been changed from 70% brightness to 30% brightness (e.g., the seven filled-in circles depicted in FIG. 1B to indicate the smart light bulb(s) are at 70% brightness being changed to three filled-in circled in FIG. 1C to indicate the smart light bulb(s) are now at 30%).

Alternatively, and in lieu of providing the spoken utterance(s) that include the third portion of the request 142 as shown in FIG. 1C, the user 102 can direct touch input to a given one of the one or more control graphical elements 144 (e.g., the third circle). Similarly, in response to the user 102 directing touch input to the given one of the one or more control graphical elements, the automated assistant can generate the structured request to be utilized in fulfilling the spoken utterance(s) of the user 102, cause the current state 122 of the smart light bulb(s) to be modified from 70% brightness to 30% brightness (assuming the user 102 directs the touch input to the third circle), and reflect the change in the brightness of the smart light bulb(s) by adapting the current state 122 to reflect the smart light bulb(s) have been changed from 70% brightness to 30% brightness as described above.

Although the example of FIG. 1A, FIG. 1B, and FIG. 1C is described with respect to the request to change the brightness of the smart light bulb(s) in various portions (e.g., the first portion 108, the second portion 122, and the third portion 142), it should be understood that is for the sake of example and is not meant to be limiting. For example, the automated assistant can dynamically adapt the GUI elements as described above even while the user 102 provides the request even if the user 102 does not pause between providing of the various portions of the request to indicate to the user 102 that the automated assistant is listening to the user 102 and fulfilling the request. As a result, instances of the user 102 repeating one or more portions of the request can be mitigated since the user 102 knows the automated assistant is fulfilling the request based on the dynamic GUI elements described herein. However, in instances where the user 102 does pause in providing of the request, the dynamic GUI elements described herein can help aid the user 102 in completing the request by at least providing the current state 122 of the smart light bulb(s) for presentation to the user 102 as the request is provided. As a result, the dialog session between the user 102 and the automated assistant can be concluded in a more quick and efficient manner. Moreover, although the example of FIG. 1A, FIG. 1B, and FIG. 1C is described with respect to the request to change the brightness of the smart light bulb(s), it should be understood that is for the sake of example and is not meant to be limiting. Rather, it should be understood that the techniques described herein can be utilized to provide dynamic GUI elements for any request directed to the automated assistant.

Figure 2A:
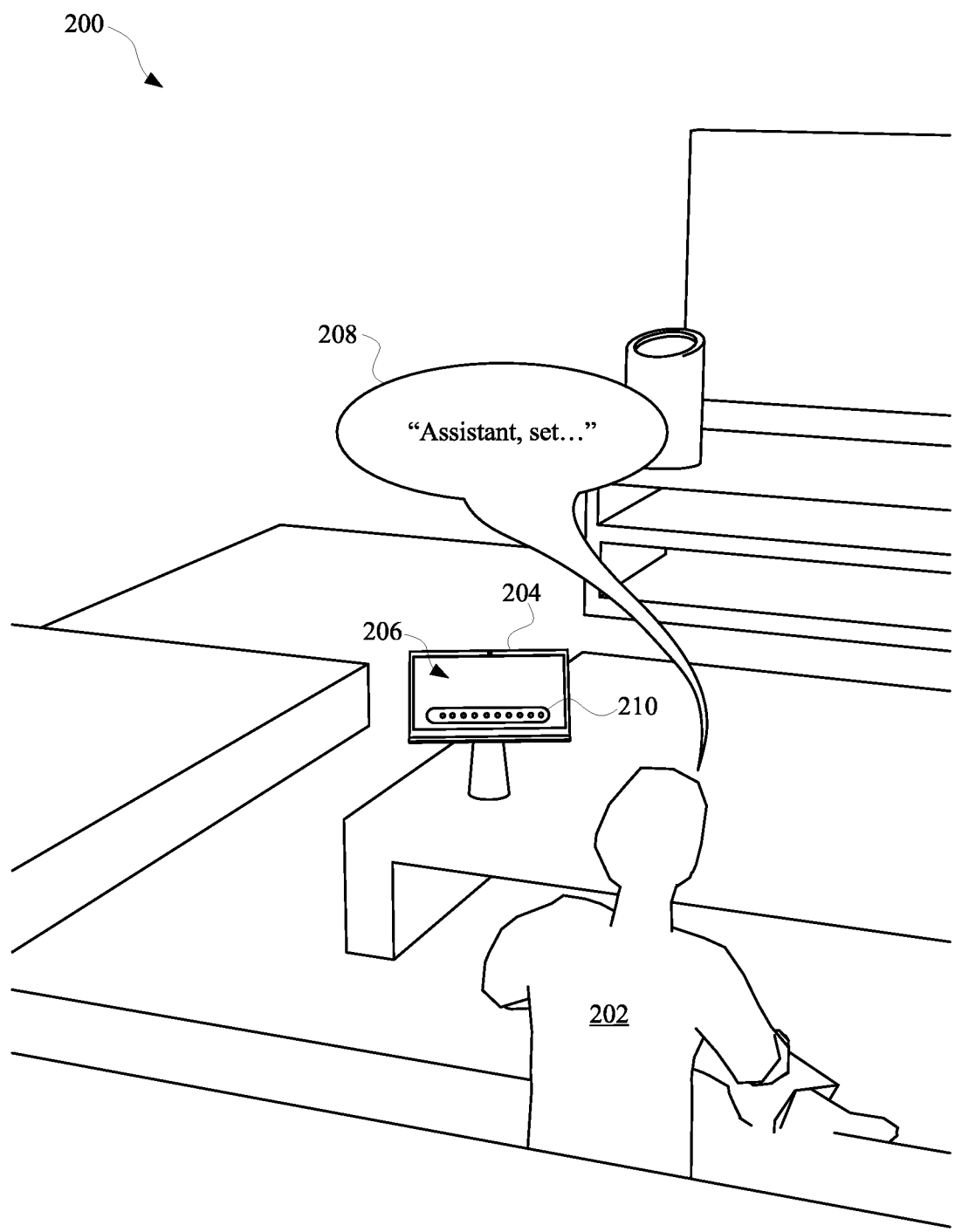
FIG. 2A, FIG. 2B, and FIG. 2C illustrate views of a user iteratively providing an additional example request to an automated assistant that iteratively renders graphical elements corresponding to portions of the additional example request, in accordance with various implementations.
Figure 2B:
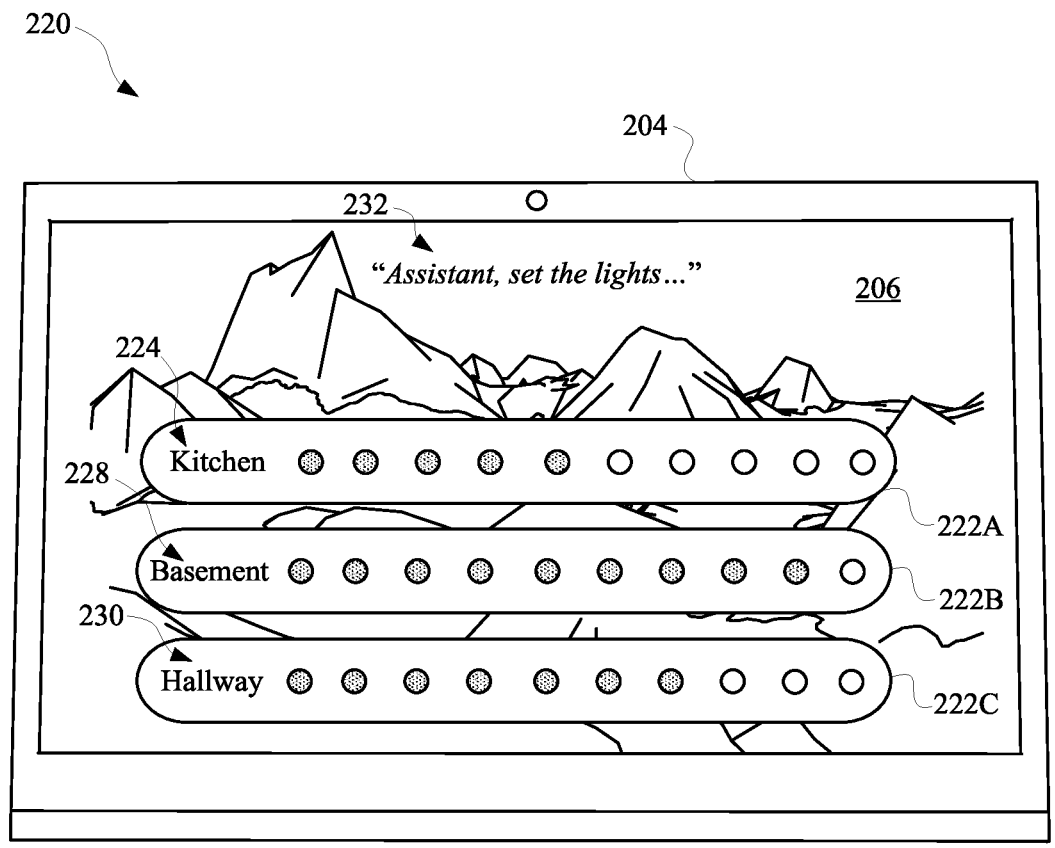
Figure 2B:
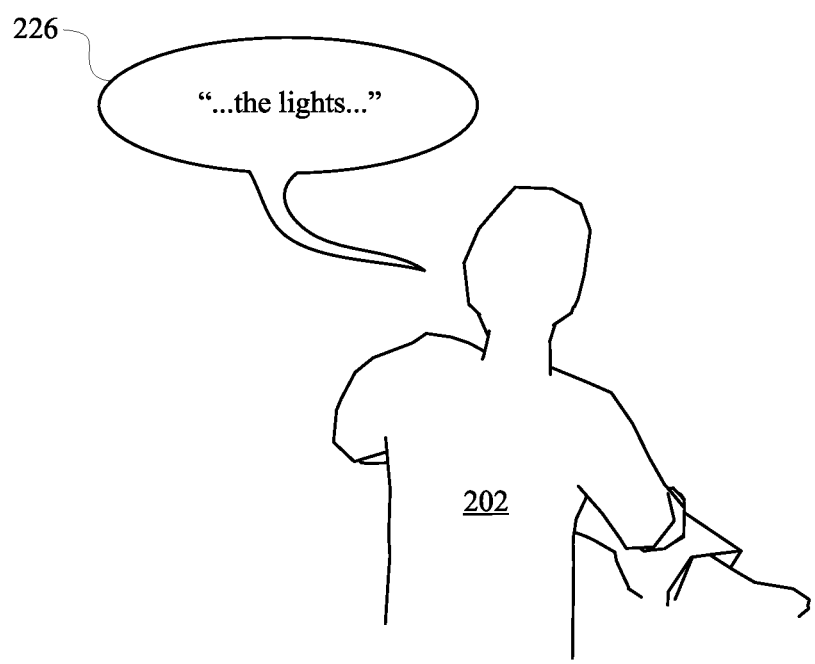
Figure 2C:
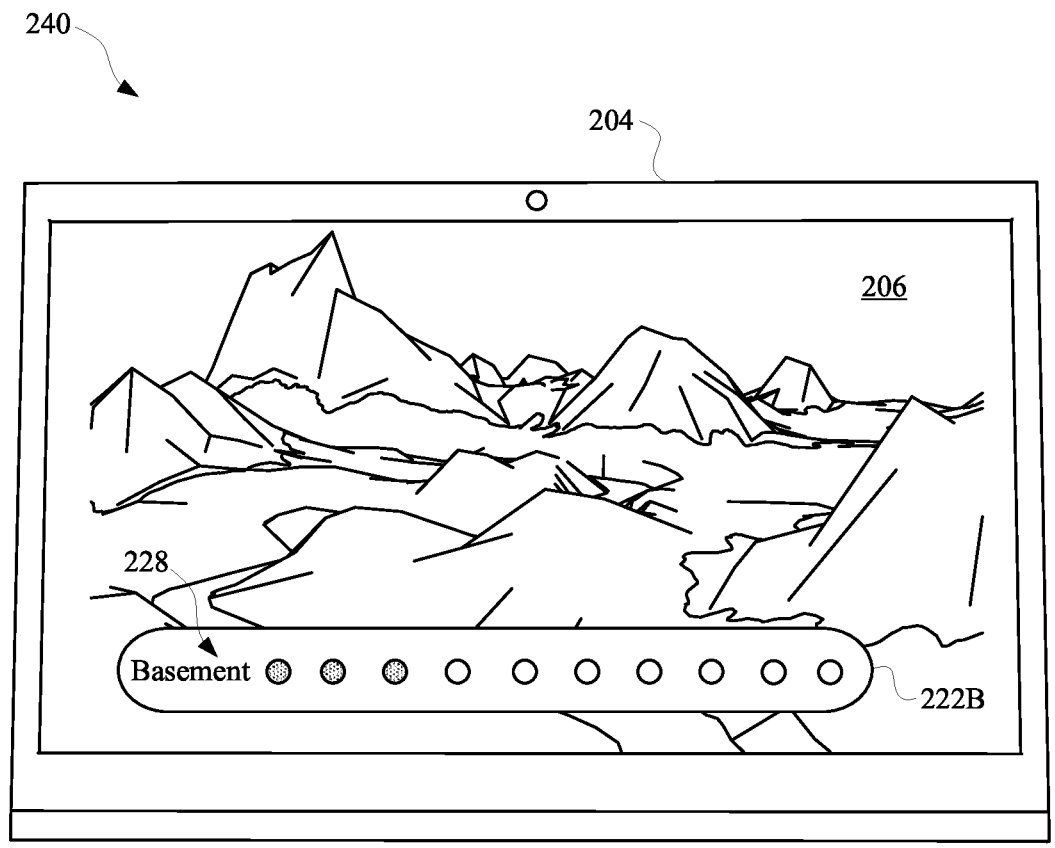

FIG. 2A, FIG. 2B, and FIG. 2C illustrate a view 200, a view 220, and a view 240, respectively, of a user 202 iteratively providing an additional example request to an automated assistant that iteratively renders graphical elements corresponding to portions of the additional example request. The request can be included in a spoken utterance that is directed to the automated assistant, or a sequence of spoken utterances that are directed to the automated assistant. For instance, in the example of FIG. 2A, assume the user 202 provides a spoken utterance of "Assistant, set . . . " that includes a first portion of a request 208 directed to the automated assistant that is accessible via a computing device 204 in a home of a user. The user 202 can provide the spoken utterance in furtherance of causing the automated assistant to perform a particular assistant action and/or execute a particular intent associated with the first portion of the request 208. Similar to the description provided above with respect to FIG. 1A, the automated assistant can cause a stream of audio data capturing the first portion of the request 208 to be processed, using a streaming automatic speech recognition (ASR) model, to generate ASR output, and can cause the ASR output to be processed, using a natural language understanding (NLU) model, to generate NLU output. In response to receiving the first portion of the request 208, the automated assistant can cause a display interface 206 of the computing device 204 to render a generic container graphical element 210 in the same or similar manner described above with respect to FIG. 1A.

Again, further assume that the user 102 continues providing of the spoken utterance or provides an additional spoken utterance that includes a second portion of the request 226 by providing " . . . the lights . . . " as illustrated in view 220 of FIG. 2B, in furtherance of providing a complete request to the automated assistant. Similarly, the stream of audio data capturing the second portion of the request 226 can be processed to generate additional ASR output and additional NLU output. Based on the additional NLU output, the automated assistant can select a particular intent that indicates to the automated assistant that the user 202 would like to modify a current state of smart light bulb(s) in the home of the user 202. Accordingly, in response to receiving the second portion of the request 226. However, and in contrast with the example of FIG. 1A, assume the user 202 has multiple groups of smart light bulb(s) grouped together throughout his/her home (e.g., a "Kitchen" group of smart light bulb(s), a "Basement" group of smart light bulb(s), and a "Hallway" group of smart light bulb(s)). Accordingly, in the example of FIG. 2A, the automated assistant can dynamically adapt multiple instances of the generic container graphical element 210 of FIG. 2A with content associated with the particular intent determined based on processing the second portion of the request 226 and based on the multiple groups of smart light bulb(s), resulting in multiple particular tailored graphical container elements 222A, 222B, and 222C.

For example, a first tailored graphical container element 222A can be associated with the "Kitchen" group of smart light bulb(s) and include a device identifier 224 of "Kitchen" along with other content (e.g., a current state of the "Kitchen" lights at 50% brightness as indicated by the five filled-in circles, control graphical elements, media content, and/or other content associated with the "Kitchen" group of smart light bulb(s)); a second tailored graphical container element 222B can be associated with the "Basement" group of smart light bulb(s) and include a device identifier 228 of "Basement" along with other content (e.g., a current state of the "Basement" lights at 90% brightness as indicated by the nine filled-in circles, control graphical elements, media content, and/or other content associated with the "Basement" group of smart light bulb(s)); and a third tailored graphical container element 222C can be associated with the "Hallway" group of smart light bulb(s) and include a device identifier 230 of "Hallway" along with other content (e.g., a current state of the "Hallway" lights at 70% brightness as indicated by the seven filled-in circles, control graphical elements, media content, and/or other content associated with the "Hallway" group of smart light bulb(s)). In some implementations, the automated assistant can retrieve the current state of each of the groups of smart light bulb(s) from an application associated with the smart light bulb(s), whereas, in other implementations, the automated assistant can retrieve the current state of each of the groups of smart light bulb(s) directly from the smart light bulb(s). Accordingly, at an instance of time that the user 202 provides the second portion of the request 226, the automated assistant can dynamically adapt multiple instances of the generic container graphical element 210, resulting in multiple distinct tailored container graphical elements to dynamically provide the user 202 with an indication of how to control the smart light bulb(s) based on the current status of each of the groups of the smart light bulb(s).

In some implementations, natural language content 232 corresponding to the request from the user 202 can be rendered at the display interface 206 as the user 202 provides the request. For example, the natural language content 232 can include a streaming transcription (e.g., "Assistant, set the lights . . . " as shown at the display interface 206 of the computing device 204 in FIG. 2B) that is determined based on the ASR output generated using the streaming ASR model in processing the stream of audio data that captures the first portion of the request 208 and the second portion of the request 226. Notably, the natural language content can be rendered simultaneous to the multiple tailored container graphical elements 222A, 222B, and 222C being rendered at the display interface 206 of the computing device 204. In these and other manners, the automated assistant can cause various graphical elements (e.g., the tailored container graphical elements 222A, 222B, and 222C, the natural language content 232, and/or other graphical elements) in an effort to aid the user 202 to quickly and efficiently complete the request, thereby reducing a duration of a dialog session between the user 202 and the automated assistant.

Further assume that the user 202 completes the request by providing a third portion of the request 242 of " . . . in the basement to 30 percent" as illustrated in view 240 of FIG. 2C, in furtherance of providing a complete request to the automated assistant. In this example, the stream of audio data capturing the third portion of the request 242 can be processed to generate ASR output and NLU output. Based on the NLU output, the automated assistant can generate a structured request to be utilized in fulfilling the spoken utterance(s) of the user 202. For example, the automated assistant can transmit the one or more structured requests to the smart light bulb(s) in the "Basement" group and/or an application associated with the smart light bulb(s) that is accessible at the computing device 204 to cause a current state of the smart light bulb(s) in the "Basement" group to be modified from 90% brightness to 30% brightness in response to receiving the third portion of the request 242 from the user 202. Further, in response to receiving the third portion of the request 242, the automated assistant can reflect the change in the brightness of the smart light bulb(s) by adapting the current state to reflect the smart light bulb(s) have been changed from 90% brightness to 30% brightness (e.g., the nine filled-in circles depicted in FIG. 2B to indicate the smart light bulb(s) in the "Basement" group are at 90% brightness being changed to three filled-in circled in FIG. 2C to indicate the smart light bulb(s) in the "Basement" group are now at 30%).

In some implementations, and as shown in FIG. 2C, when the ASR output indicates that the user has selected a particular group of the smart light bulb(s) (e.g., the "Basement" group in the example of FIG. 2C), the automated assistant can remove the other tailored container graphical elements 222A and 222C from the display interface 206 of the computing device 204, such that the tailored container graphical element 222B associated with the particular intent of the user 202 is the only remaining tailored container graphical element. In some implementations, the ASR and/or NLU processes performed via the automated assistant can be biased according to content of the container graphical elements. For instance, in response to receiving the third portion of the request 242, the automated assistant can bias the ASR processing and/or the ASR output towards "Kitchen", "Basement", and "Hallway".

Figure 3:
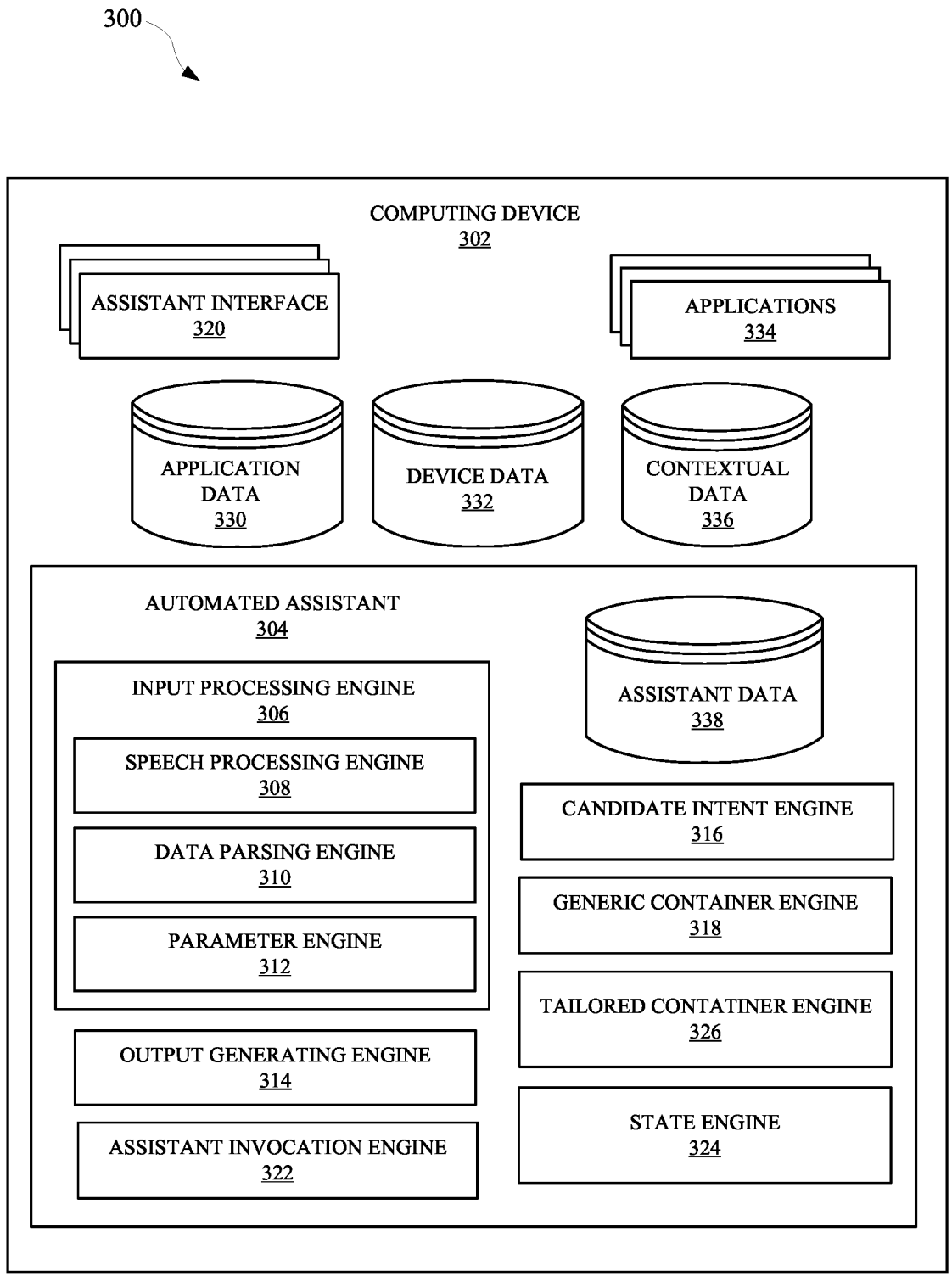
FIG. 3 illustrates a system that provides an automated assistant that iteratively constructs graphical elements as a user provides a request directed to the automated assistant, in accordance with various implementations.

FIG. 3 illustrates a system 300 that provides an automated assistant 304 that iteratively constructs graphical elements as a user provides a request directed to the automated assistant 304. The automated assistant 304 can operate as part of an assistant application that is provided at one or more computing devices, such as a computing device 302 (e.g., an instance of the computing device 104, an instance of the computing device 204, etc.) and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface (e.g., the display interface 106 of the computing device 104, the display interface 206 of the computing device 204). In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third-party client devices can be in communication with a server device over a network, such as the Internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted locally at the computing device 302, and various processes that can be associated with automated assistant operations can be performed exclusively at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on-top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308 that utilizes a streaming ASR model, which can process a stream of audio data received at an assistant interface 320 to generate ASR output, such as the text embodied in the stream of audio data. Also, for instance, the input processing engine 306 can determine audio-based characteristics that are associated with any spoken utterance(s)/request(s) that are captured in the stream of audio data using audio-based machine learning models and/or heuristic-based approaches. In some implementations, the stream of audio data can be transmitted from, for example, the computing device 302 to the server device in order to preserve computational resources at the computing device 302. Additionally, or alternatively, the stream of audio data can be exclusively processed at the computing device 302.

The process for converting the audio data to text can include a speech recognition algorithm, which can employ neural networks, and/or statistical models for identifying groups of audio data corresponding to words or phrases (e.g., the streaming ASR model described herein). The text converted from the audio data can be parsed by a data parsing engine 310 that utilizes an NLU model and made available to the automated assistant 304 as textual data that can be used to generate NLU output, such as command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user (e.g., visual output and/or audible output), and/or communicate with one or more applications 334 for providing an output to one or more applications 334.

In some implementations, and as noted above, the automated assistant 304 can be an application that can be installed "on-top of" an operating system of the computing device 302 and/or can itself form part of (or the entirety of) the operating system of the computing device 302. The automated assistant application includes, and/or has access to, on-device ASR, on-device NLU, and on-device fulfillment. For example, on-device ASR can be performed using the streaming ASR model that processes the stream of audio data (detected by the microphone(s)) using an end-to-end streaming ASR model stored locally at the computing device 302. The on-device speech recognition generates ASR output, such as recognized text for a spoken utterance (if any) present in the stream of audio data. Also, for example, on-device NLU can be performed using an on-device NLU model that processes the ASR output, generated using the streaming ASR model, and optionally contextual data, to generate the NLU output. The NLU output can include candidate intent(s) that correspond to the spoken utterance and optionally slot value(s) for corresponding parameter(s) associated with the candidate intent(s).

On-device fulfillment can be performed using an on-device fulfillment model or fulfillment rules that utilize the NLU output, and optionally other local data, to determine generate structured request(s) for determining action(s) to take to resolve the intent(s) of the spoken utterance (and optionally the slot value(s) for the corresponding parameter(s) associated with the candidate intent(s)). This can include determining local and/or remote responses (e.g., answers) to the spoken utterance(s) and/or request(s), interaction(s) with locally installed application(s) to perform based on the spoken utterance(s) and/or request(s), command(s) to transmit to internet-of-things (IoT) device(s) (directly or via corresponding remote system(s)) based on the spoken utterance(s) and/or request(s), and/or other resolution action(s) to perform based on the spoken utterance(s) and/or request(s). The on-device fulfillment can then initiate local and/or remote performance/execution of the determined action(s) to resolve the spoken utterance(s) and/or request(s).

In various implementations, remote speech processing, remote NLU, and/or remote fulfillment can at least selectively be utilized to conserve computation resources at the computing device 302. For example, recognized text can at least selectively be transmitted to remote automated assistant component(s) remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can have access to one or more applications 334 which can be provided by a third-party entity that is different from an entity that provided the computing device 302 and/or the automated assistant 304, or a first-party entity that is the same entity that provided the computing device 302 and/or the automated assistant 304. The automated assistant 304 and/or the computing device 302 can access application data 330 to determine one or more actions capable of being performed by one or more applications 334, as well as a state of each application of the one or more applications 334 and/or a state of a respective device that is associated with the computing device 302. Further, the automated assistant 304 and/or the computing device 302 can access device data 332 to determine one or more actions capable of being performed by the computing device 302 and/or one or more devices that are associated with the computing device 302. Moreover, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states.

The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the system 300 can include a candidate intent engine 316 for determining one or more candidate intents that can be associated with one or more portions of a request provided by a user to the automated assistant 304. For instance, when a user provides a spoken utterance such as, "Assistant, play . . . ", the candidate intent engine 316 can identify one or more intents that may be associated with the spoken utterance based on the NLU output described above. Alternatively, or additionally, the candidate intent engine 316 can filter out certain candidate intents that may not be relevant to the spoken utterance provided by the user.

In some implementations, the system 300 can include a generic container engine 318 that can obtain and/or generate one or more generic container graphical elements based on the one or more candidate intents identified by the candidate intent engine 316. A generic container graphical element can be obtained (e.g., from on-device memory of the computing device 302) or generated in response to receiving spoken utterance(s) that include a request for the automated assistant 304 to fulfill. The generic container graphical element can be assigned other elements and/or features associated with one or more requests that the user is predicted to be providing via the spoken utterance(s). For example, although an initial spoken utterance, such as, "Assistant, play . . . ," does not identify a particular slot value (e.g., a song, an artist, a movie, a streaming service, etc.), the generic container engine 318 can identify a type of slot value that is predicted to be associated with the request. Based on this type of slot value, the generic container engine 318 can obtain and/or generate a generic container graphical element that can be dynamically adapted based on portions of the request that have yet to be received at the computing device 302. For example, an initial spoken utterance that includes the term "play" can be associated with types of slot values for controlling media playback. Therefore, a generic container graphical element associated with "media playback" features can be selected by the generic container engine 318, and subsequently dynamically adapted with features associated with media playback. Alternatively, an initial spoken utterance that includes the term "turn" can be associated with types of slots values for controlling an output level of an application and/or a device. Therefore, a generic container graphical element associated with adjusting settings of the application and/or the device can be selected by the generic container engine 318, and subsequently dynamically adapted with features associated with settings for controlling an output level of the application and/or the device.

In some implementations, the system 300 can include a tailored container engine 326, which can obtain and/or generate control elements for assigning dynamically adapting the generic container graphical element, resulting in a tailored container graphical element. For example, the tailored container engine 326 can iteratively assign and/or remove control elements at the generic container graphical element as a user provides additional portions of the request to the automated assistant 304. Each control element can be associated with a slot value and/or a type of slot value that is determined to correspond to the request that the user is predicted to be providing to the automated assistant 304. For example, when the user is predicted to be requesting that the automated assistant 304 modify a device setting that can have a range of numerical values, the tailored container engine 326 can select a "sliding" GUI element (or any other element suitable for controlling the device setting) to be assigned to the container graphical element. Alternatively, when the user is predicted to be providing the automated assistant 304 with a request to control playback of media content (e.g., audio and/or video), the tailored container engine 326 can select one or more media playback control elements (e.g., pause button, play button, skip buttons, etc.) to be assigned to the container graphical element.

In some implementations, the system 300 can include a state engine 324 that can obtain and/or remove a current state of an application and/or device for the tailored container graphical element as a user provides additional portions of the request to the automated assistant 304. Further, the state engine can determine an updated state for the application and/or device based on processing the spoken utterance(s) and/or the touch input(s) associated with the request. For example, when the user is predicted to be requesting that the automated assistant 304 modify a setting of another computing device, the state engine 326 can determine a current state of the setting for the other computing device. Based on this current state, the state engine 326 can identify a state GUI element that can characterize the status of the device, and cause the state GUI element to be incorporated into the tailored container graphical element. For instance, when the state of the setting corresponds to a value within a range of numerical values, the state engine 326 can generate a state GUI element that characterizes the range of numerical values and emphasizes the current state of the setting. This state GUI element can then be incorporated into the tailored container graphical element that is currently being rendered at an interface of the computing device 302. In this way, as the user continues to provide additional portions of the request, the user can be put on notice of the current state for the setting, thereby refreshing their recollection of any current states and aiding the user in determining a desired updated state relative to the current state.

Figure 4A:
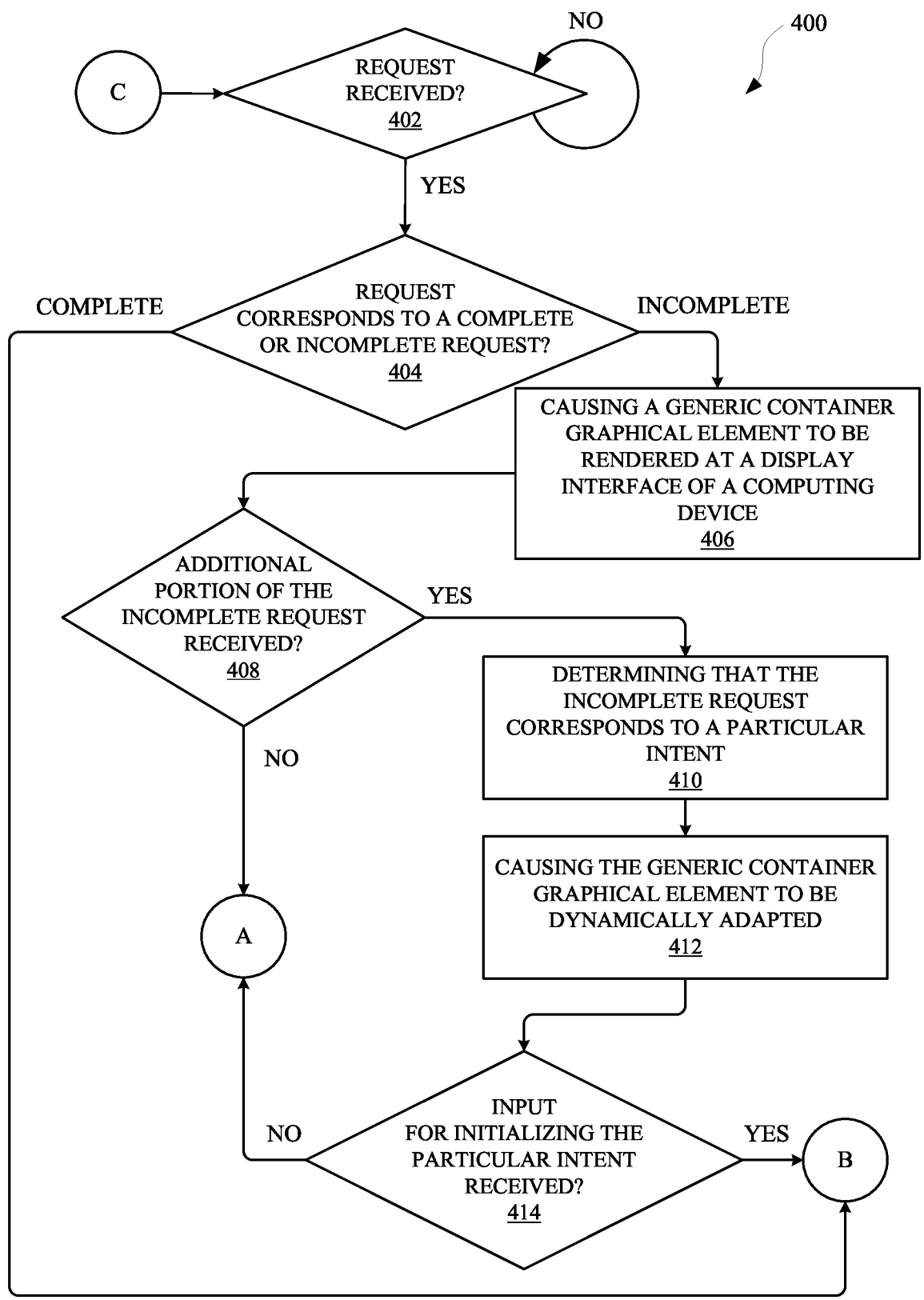
FIG. 4A and FIG. 4B illustrate a method for controlling an automated assistant to iteratively provide graphical elements at a display interface, as a user provides a request directed to the automated assistant, in accordance with various implementations.
Figure 4B:
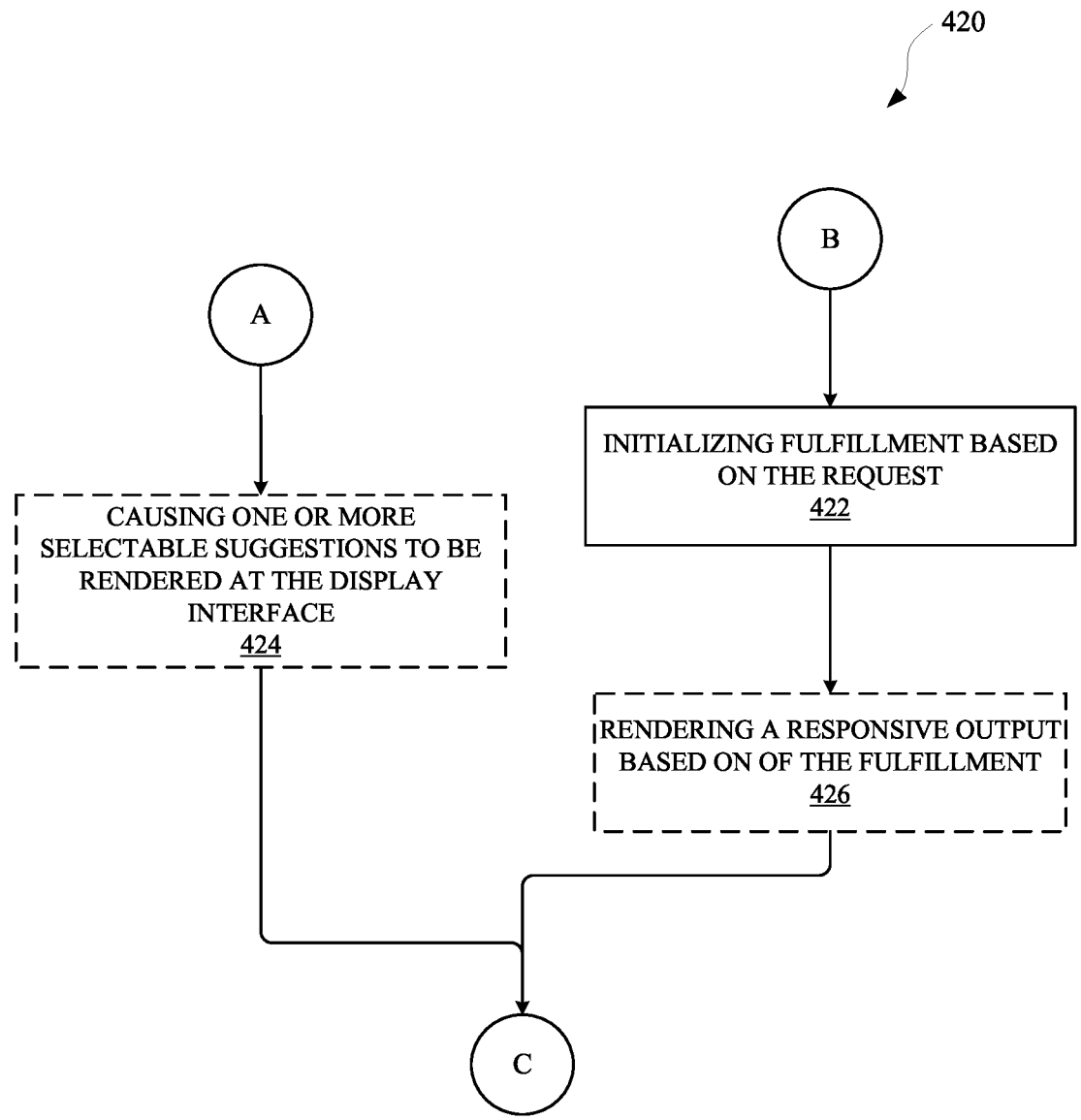

FIG. 4A and FIG. 4B illustrate a method 400 and a method 420 for controlling an automated assistant to iteratively provide graphical elements at a display interface, as a user provides a request directed to the automated assistant. The method 400 and the method 420 can be performed by one or more applications, computing devices, and/or any other application or module capable of interacting with an automated assistant. The method 400 can include an operation 402 for determining whether a user has provided a request to the automated assistant. The request can be, for example, included in a spoken utterance, such as "Assistant, adjust . . . ", which can refer to a first portion of a request to be fulfilled by the automated assistant.

When the automated assistant has determined that at least a portion of the request has been received, the method 400 can proceed from the operation 402 to an operation 404. The operation 404 can include determining whether the request corresponds to a complete request or an incomplete request. In other words, the automated assistant can determine whether the user has provided enough information for the automated assistant to initialize fulfillment of the request. In accordance with the aforementioned example, when the user provides the spoken utterance "Assistant, adjust . . . ", the automated assistant can determine that the request corresponds to an incomplete request. Based on this determination, the method 400 can proceed from the operation 404 to an operation 406. Otherwise, if the automated assistant determines that the request corresponds to a complete request, the method 400 can proceed from the operation 404, via continuation element "B," to an operation 424 as illustrated in FIG. 4A and FIG. 4B and as described with respect to FIG. 4B. In various implementations, even when it is determined that the request is a complete request at the operation 404, the method 400 can proceed to the operation 406. Accordingly, it should be understood that the method 400 and the method 420 are provide simply for the sake of example and are not meant to be limiting.

The operation 406 can include causing a generic container graphical element to be rendered at a display interface of a computing device. The generic container graphical element can operate as a placeholder for other graphical elements to which the generic container graphical element can be dynamically adapted. For example, the generic container graphical element can be a graphical rendering of a shape with a body that includes enough area for other graphical elements to be assigned. The other graphical elements can include, but are not limited to, control elements for controlling one or more applications and/or devices, state elements for indicating a current state of one or more applications and/or devices, device identifiers of one or more applications and/or devices, media elements that are based on media content, and/or any other type of element that can be rendered at a display interface. The method 400 can proceed from the operation 406 to an operation 408, which can include determining whether an additional portion of the incomplete request has been received by the automated assistant.

The additional portion of the request can be a spoken utterance such as, " . . . the temperature . . . " When an additional portion of the incomplete request is determined to have been received, the method 400 can proceed from the operation 408 to an operation 410. Otherwise, when another portion of the incomplete request is determined to have not been received, the method 400 can proceed from the operation 408, via continuation element "A," to an optional operation 424 of method 420, as illustrated in FIG. 4A and FIG. 4B and as described with respect to FIG. 4B. The optional operation 424 as shown in FIG. 4B can include causing one or more selectable suggestions to be rendered at the display interface. The one or more selectable suggestions can be based on one or more portions of the incomplete request that have been received by the automated assistant from the user. In this way, although the user did not provide a request that was complete, the automated assistant can nonetheless provide one or more selectable suggestions that are predicted to correspond to one or more intents that the user may be attempting to convey. Thereafter, the method 420 can optionally return to the operation 402 via continuation element "C," as illustrated in FIG. 4A and FIG. 4B.

When an additional portion of the incomplete request is determined to have been received at the operation 408, the method 400 can proceed from the operation 408 to an operation 410. The operation 410 can include determining that the incomplete request corresponds to a particular intent. In some instances, the operation 410 can be performed after the user has provided one or more additional inputs for completing the incomplete request. For example, when the user has provided a first portion of the request, "Assistant, adjust . . . " followed by a second portion of the request, " . . . the temperature . . . ," (e.g., that is included in the same spoken utterance or additional spoken utterance that follows that spoken utterance) the automated assistant can determine that the user is requesting that a temperature setting of an application and/or device be modified. In some implementations, the particular intent can have slot value(s) for corresponding parameter(s) associated with the particular intent. In some implementations, the request from the user can be considered incomplete based on a predicted probability, as determined by the automated assistant or other application. For instance, predicted probability can indicate a likelihood that a user is requesting that a particular intent to be executed. When the predicted probability satisfies a probability threshold, the request from the user can be considered complete. Thereafter, the slot value(s) for the corresponding parameter(s) can be assigned to the particular intent based on additional input from the user and/or data that is available to the automated assistant.

The method 400 can proceed from the operation 410 to an operation 412, which can include causing the generic container graphical element to be dynamically adapted, which can result in a tailored container graphical element that is specific to the particular intent. The tailored container graphical element can include one or more control elements for controlling a particular assistant action, one or more state elements that indicate a status of an application and/or a device, and/or other content described herein. For example, based on the portions of the request (e.g., "Assistant, adjust . . . the temperature . . . "), the automated assistant can cause various graphical element to be dynamically adapted to the generic container graphical element for indicating a current temperature setting of a particular device (e.g., a hallway thermostat). Alternatively, or additionally, the automated assistant can cause a separate graphical element to be assigned to the generic container graphical element for adjusting the temperature setting of the particular device. In this way, the user will be able to see a current state of the particular device and also an option for controlling the particular device. By iteratively assigning graphical elements to the container graphical element, the automated assistant and computing devices can preserve time and resources that would otherwise be consumed waiting for the user to provide a completed request.

The method 400 can proceed from the operation 412 to an operation 414, which can include determining whether an input for initializing the particular assistant action has been received. The input can be, for example, another portion of the request included in the same spoken utterance or additional spoken utterance that follows the spoken utterance (e.g., " . . . to 72 degrees . . . ") and/or a touch input at an area of the display interface that is rendering the particular tailored container graphical element. When the input is determined to have been received for initializing fulfillment of the request, the method 400 can proceed from the operation 414, via continuation element "B," to an operation 422 of method 420 as illustrated in FIG. 4A and FIG. 4B and as described with respect to FIG. 4B. Otherwise, the method 400 can proceed from the operation 414, via continuation element "A," to the optional operation 424 and/or the operation 402.

The operation 422 can include initializing fulfillment based on the request from the user. The fulfillment can correspond to executing the particular intent to fulfill the request. For example, the user can provide an additional spoken utterance such as, " . . . to 72 degrees . . . " based on the particular tailored container graphical element indicating that a current state of the device is 67 degrees. Therefore, a recollection of the user can be refreshed by the information conveyed at the particular tailored container graphical element. The method 420 can proceed from the operation 422 to an optional operation 426, which can include rendering a responsive output based on the fulfillment. For example, the particular tailored container graphical element can be assigned additional content based on performance of the fulfillment. In accordance with the aforementioned example, the container graphical element can be assigned additional graphical content for indicating that the temperature setting of the device has been successfully adjusted or modified from a current state of 67 degrees to an updated state 72 degrees. Thereafter, the method 420 can return to the operation 402 via continuation element "C."

Figure 5:
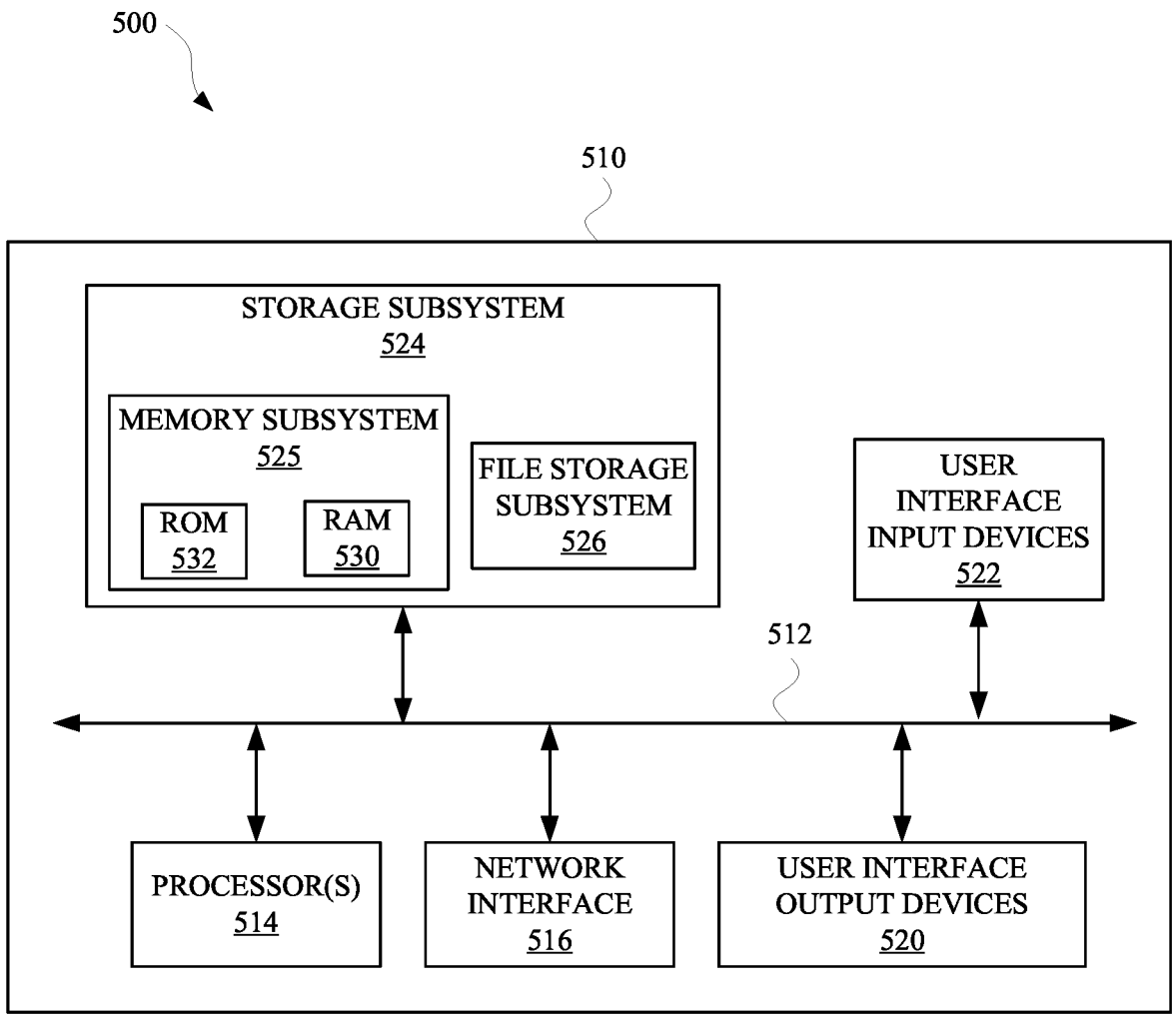
FIG. 5 is a block diagram of an example computer system, in accordance with various implementations.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 204, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided, and includes receiving, at a computing device, a first portion of a request from a user that is included in a spoken utterance. The spoken utterance is directed to an automated assistant that is accessible via the computing device. The method further includes determining, based on processing the first portion of the request, one or more candidate intents that are associated with the first portion of the request, and causing, based on the one or more candidate intents, a generic container graphical element to be rendered at a display interface of the computing device. The generic container graphical element can be dynamically adapted with any one of multiple disparate tailored container graphical elements, and each of the multiple disparate tailored container graphical elements is associated with a corresponding one of the one or more candidate intents. The method further includes receiving, at the computing device, a second portion of the request from the user that is also included in the spoken utterance or that is included in an additional spoken utterance that is received subsequent to the spoken utterance, determining, based on processing the second portion of the request, that the request corresponds to a particular intent of the one or more candidate intents, and causing, based on the particular intent, the generic container graphical element rendered at the display interface to be dynamically adapted with a particular tailored container graphical element, of the multiple disparate tailored container graphical elements.

These and other implementations of technology described herein can optionally include one or more of the following features.

In some implementations, the particular tailored container graphical element may characterize a slot value for a corresponding parameter associated with the particular intent, and the first portion of the request and the second portion of the request may not identify the slot value.

In some implementations, the method may further include causing, in response to receiving the first portion of the request, the display interface of the computing device to visually render natural language content characterizing the first portion of the request. The display interface may render the natural language content of the first portion of the request simultaneous to rendering the generic container graphical element.

In some implementations, the method may further include determining, subsequent to receiving the first portion of the request, that a threshold duration of time has lapsed. Causing the generic container graphical element to be rendered at the display interface may be performed based on the threshold duration of time lapsing.

In some implementations, the particular tailored container graphical element may include a particular graphical control element that is associated with a current state of one or more settings of the computing device or one or more additional computing devices in communication with the computing device. In some versions of those implementations, the method may further include receiving, at the computing device, a third portion of the request from the user that is also included in the spoken utterance, the additional spoken utterance, or a further additional spoken utterance that is received subsequent to the spoken utterance or the additional spoken utterance, the third portion of the request including an updated state for the one or more settings, and causing, by the automated assistant, the one or more settings of the computing device or one or more of the additional computing devices to be changed from the current state to the updated state.

In some implementations, causing the generic container graphical element rendered at the display interface to be dynamically adapted to the particular tailored container graphical element may include selecting the particular tailored container graphical element, from among the multiple disparate tailored container graphical elements, based on a type of slot value identified in the second spoken utterance. The type of slot value may correspond to numerical value that is limited to a range of numerical values.

In some implementations, the generic container graphical element may be rendered at the display interface of the computing device prior to receiving the second portion of the request.

In some implementations, the generic container graphical element may be rendered at the display interface of the computing device while the second portion of the request is being received.

In some implementations, determining, based on processing the first portion of the request, one or more candidate intents that are associated with the first portion of the request may include processing, using a streaming automatic speech recognition (ASR) model, a stream of audio data generated by one or more microphones of the computing device to generate ASR output, the stream of audio data capturing the first portion of the request, processing, using a natural language understanding (NLU) model, the ASR output to generate NLU output, and determining, based on the NLU output, the one or more candidate intents that are associated with the first portion of the request. In some versions of those implementations, determining, based on processing the second portion of the request, that the request corresponds to a particular intent of the one or more candidate intents may include processing, using the streaming ASR model, the stream of audio data to generate additional ASR output, the stream of audio data also capturing the second portion of the request, processing, using the NLU model, the additional ASR output to generate additional NLU output, and selecting, based on the additional NLU output, the particular intent from among the one or more candidate intents.

In some implementations, a method implemented by one or more processors is provided, and includes receiving, at a computing device, a portion of a request submitted by a user, the portion of the request being included in a spoken utterance that is directed to an automated assistant accessible via the computing device, determining, by the automated assistant, that the portion of the request is associated with modifying a current state of one or more settings of the computing device or one or more additional computing devices in communication with the computing device via the automated assistant, determining, based on the current state of the one or more settings, tailored container graphical element data that characterizes the current state of the one or more settings; causing, based on the tailored container graphical element data, a display interface of the computing device to render one or more tailored container graphical elements that indicate the current state of the one or more settings; and in response to causing the display interface of the computing device to render the one or more tailored container graphical elements that indicate the current state of the one or more settings: receiving, at the computing device, an additional portion of the request submitted by the user, the additional portion of the request being included in the spoken utterance or an additional spoken utterance that is received subsequent to the spoken utterance, and the additional portion of the request including an updated state for the one or more settings, and causing, by the automated assistant, the one or more settings of the computing device or one or more of the additional computing devices to be changed from the current state to the updated state.

These and other implementations of technology described herein can optionally include one or more of the following features.

In some implementations, each of the one or more tailored container graphical elements may include a graphical icon for representing the current state of the one or more settings.

In some implementations, the method may further include causing, in response to receiving the portion of the request, the display interface of the computing device to visually render natural language content that characterizes the portion of the request. The one or more tailored graphical container elements may be rendered simultaneous to the display interface rendering the natural language content.

In some implementations, the portion of the request may not include the current state of the one or more settings.

In some implementations, causing, based on the tailored container graphical element data, the display interface of the computing device to render the one or more tailored container graphical elements that indicate the current state of the one or more settings may include causing a first tailored container graphical element, of the one or more tailored container graphical elements, to be rendered that indicates a first setting, of the one or more settings, of a first computing device, of the one or more additional computing devices, that is separate from the computing device, and causing a second tailored container graphical element, of the one or more tailored container graphical elements, to be rendered that indicates a second setting, of the one or more settings, of a second computing device, of the one or more additional computing devices, that is separate from the computing device. In some versions of those implementations, the first setting of the first computing device may correspond to a volume setting of the first computing device, and the second setting of the second computing device may correspond to a volume setting of the second computing device. In additional or alternative versions of those implementations, the first setting of the first computing device may correspond to a brightness setting of the first computing device, and the second setting of the second computing device may correspond to a brightness setting of the second computing device.

In some implementations, the method may further include determining, based on processing the portion of the request, that the user has paused in providing of the request. Causing the display interface of the computing device to render the one or more tailored container graphical elements that indicate the current state of the one or more setting may be in response to determining that the user has paused in providing of the request. In some versions of those implementations, determining, based on processing the portion of the request, that the user has paused in providing of the request may include determining, based on processing the portion of the request, that the user has paused in providing of the request after providing a particular word or phrase. In additional or alternative versions of those implementations, causing the display interface of the computing device to render the one or more tailored container graphical elements that indicate the current state of the one or more setting may be in response to determining that the user has paused in providing of the request for a threshold duration of time. In additional or alternative versions of those implementations, determining, based on processing the portion of the request, that the user has paused in providing of the request may include processing, using a streaming automatic speech recognition (ASR) model, a stream of audio data generated by one or more microphones of the computing device to generate ASR output, the stream of audio data capturing the portion of the request, processing, using a natural language understanding (NLU) model, the ASR output to generate NLU output, and determining, based on the NLU output, that the user has paused in providing of the request. In additional or alternative versions of those implementations, determining, based on processing the portion of the request, that the user has paused in providing of the request may include determining, based on processing the portion of the request, audio-based characteristics associated with the portion of the request, and determining, based on the audio-based characteristics associated with the portion of the request, that the user has paused in providing of the request.

In some implementations, a method implemented by one or more processors is provided, and includes receiving, at a computing device, a first portion of a request from a user that is included in a spoken utterance. The spoken utterance is directed to an automated assistant that is accessible via the computing device. The method further includes determining, based on processing the first portion of the request, the portion of the request includes a particular word or phrase associated with controlling the computing device or one or more additional computing devices in communication with the computing device, and causing, based on the first portion of the request including the particular word or phrase, a generic container graphical element to be rendered at a display interface of the computing device. The generic container graphical element can be dynamically adapted with any one of multiple disparate tailored container graphical elements, and each of the multiple disparate tailored container graphical elements is associated with a corresponding intent determined based on processing the first portion of the spoken utterance. The method further includes receiving, at the computing device, a second portion of the request from the user that is also included in the spoken utterance or that is included in an additional spoken utterance that is received subsequent to the spoken utterance, determining, based on processing the second portion of the request, that the request corresponds to a particular intent of the one or more candidate intents, and causing, based on the particular intent, the generic container graphical element rendered at the display interface to be dynamically adapted with a particular tailored container graphical element, of the multiple disparate tailored container graphical elements.

These and other implementations of technology described herein can optionally include one or more of the following features.

In some implementations, determining, based on processing the first portion of the request, the portion of the request includes the particular word or phrase associated with controlling the computing device or the one or more additional computing devices in communication with the computing device may include processing, using a streaming automatic speech recognition (ASR) model, a stream of audio data generated by one or more microphones of the computing device to generate ASR output, the stream of audio data capturing the first portion of the request, and determining, based on the ASR output, that the portion of the request includes the particular word or phrase associated with controlling the computing device or the one or more additional computing devices.

In some versions of those implementations, causing, based on the first portion of the request including the particular word or phrase, the generic container graphical element to be rendered at the display interface of the computing device may include determining that the particular word or phrase is mapped, in on-device memory of the computing device, to the generic container graphical element, and in response to determining that the particular word or phrase is mapped to the generic container graphical element: causing the generic container graphical element to be rendered at the display interface of the computing device without processing the ASR output using a natural language understanding (NLU) model.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A method implemented by one or more processors, the method comprising:

receiving, at a computing device, a first portion of a request from a user that is included in a spoken utterance,
  wherein the spoken utterance is directed to an automated assistant that is accessible via the computing device;

determining, based on processing the first portion of the request, one or more candidate intents that are associated with the first portion of the request, wherein processing the first portion of the request comprises processing, using a streaming automatic speech recognition (ASR) model, a stream of audio data to generate a first streaming transcription corresponding to first natural language content for the first portion of the request, and wherein determining the one or more candidates intents is based on processing the first streaming transcription corresponding to the first natural language content for the first portion of the request;

causing, based on the one or more candidate intents, a generic container graphical element to be rendered, along with the first streaming transcription corresponding to the first natural language content for the first portion of the request, at a display interface of the computing device,
  wherein the generic container graphical element can be dynamically adapted with any one of multiple disparate tailored container graphical elements, and
  wherein each of the multiple disparate tailored container graphical elements is associated with a corresponding one of the one or more candidate intents;

receiving, at the computing device, a second portion of the request from the user that is also included in the spoken utterance or that is included in an additional spoken utterance that is received subsequent to the spoken utterance;

determining, based on processing the second portion of the request, that the request corresponds to a particular intent of the one or more candidate intents, wherein processing the second portion of the request comprises processing, using the streaming ASR model, the stream of audio data to generate a second streaming transcription corresponding to second natural language content for the second portion of the request, and wherein determining that the request corresponds to the particular intent is based on processing the second streaming transcription corresponding to the second natural language content for the second portion of the request; and causing, based on the particular intent, the generic container graphical element rendered at the display interface to be dynamically adapted with a particular tailored container graphical element, of the multiple disparate tailored container graphical elements.

2. The method of claim 1,
wherein the particular tailored container graphical element characterizes a slot value for a corresponding parameter associated with the particular intent, and
wherein the first portion of the request and the second portion of the request do not identify the slot value.

3. The method of claim 1, further comprising:
causing, in response to receiving the first portion of the request, the display interface of the computing device to visually render natural language content characterizing the first portion of the request,
  wherein the display interface renders the natural language content of the first portion of the request simultaneous to rendering the generic container graphical element.

4. The method of claim 1, further comprising:
determining, subsequent to receiving the first portion of the request, that a threshold duration of time has lapsed,
  wherein causing the generic container graphical element to be rendered at the display interface is performed based on the threshold duration of time lapsing.

5. The method of claim 1, wherein causing the generic container graphical element rendered at the display interface to be dynamically adapted to the particular tailored container graphical element comprises:
selecting the particular tailored container graphical element, from among the multiple disparate tailored container graphical elements, based on a type of slot value identified in the second spoken utterance,
  wherein the type of slot value corresponds to numerical value that is limited to a range of numerical values.

6. The method of claim 1, wherein the generic container graphical element is rendered at the display interface of the computing device prior to receiving the second portion of the request.

7. The method of claim 1, wherein the generic container graphical element is rendered at the display interface of the computing device while the second portion of the request is being received.

8. The method of claim 1, wherein determining the one or more candidate intents based on processing the first streaming transcription corresponding to the first natural language content for the first portion of the request comprises:
processing, using a natural language understanding (NLU) model, the first streaming transcription corresponding to the first natural language content to generate first NLU output; and
determining, based on the first NLU output, the one or more candidate intents that are associated with the first portion of the request.

9. The method of claim 8, wherein determining that the request corresponds to the particular intent based on processing the second streaming transcription corresponding to second natural language content for the second portion of the request comprises:
processing, using the NLU model, the second streaming transcription corresponding to second natural language content for the second portion of the request to generate second NLU output; and
selecting, based on the second NLU output, the particular intent.

10. The method of claim 1, wherein the particular tailored container graphical element includes a particular graphical control element that is associated with a current state of one or more settings of the computing device or one or more additional computing devices in communication with the computing device.

11. The method of claim 10, further comprising:
receiving, at the computing device, a third portion of the request from the user that is also included in the spoken utterance, the additional spoken utterance, or a further additional spoken utterance that is received subsequent to the spoken utterance or the additional spoken utterance, the third portion of the request including an updated state for the one or more settings; and causing, by the automated assistant, the one or more settings of the computing device or one or more of the additional computing devices to be changed from the current state to the updated state.

12. A method implemented by one or more processors, the method comprising:

receiving, at a computing device, a portion of a request submitted by a user, the portion of the request being included in a spoken utterance that is directed to an automated assistant accessible via the computing device;

determining, by the automated assistant and based on processing the portion of the request, that the portion of the request is associated with modifying a current state of one or more settings of the computing device or one or more additional computing devices in communication with the computing device via the automated assistant wherein processing the portion of the request comprises processing, using a streaming automatic speech recognition (ASR) model, a stream of audio data to generate a streaming transcription corresponding to natural language content for the portion of the request, and wherein determining that the portion of the request is associated with modifying the current state of the one or more setting is based on processing the streaming transcription corresponding to the natural language content for the portion of the request;

determining, based on the current state of the one or more settings, tailored container graphical element data that characterizes the current state of the one or more settings;

causing, based on the tailored container graphical element data, a display interface of the computing device to render: one or more tailored container graphical elements that indicate the current state of the one or more settings, and the streaming transcription corresponding to the natural language content for the portion of the request; and in response to causing the display interface of the computing device to render the one or more tailored container graphical elements that indicate the current state of the one or more settings:

receiving, at the computing device, an additional portion of the request submitted by the user, the additional portion of the request being included in the spoken utterance or an additional spoken utterance that is received subsequent to the spoken utterance;

determining, by the automated assistant and based on processing the additional portion of the request, that the additional portion of the request includes an updated state for the one or more settings, wherein processing the additional portion of the request comprises processing, using the streaming ASR model, the stream of audio data to generate an additional streaming transcription corresponding to additional natural language content for the additional portion of the request, and wherein determining that the additional portion of the request includes the updated state for the one or more settings is based on processing the additional streaming transcription corresponding to the additional natural language content for the additional portion of the request; and causing, by the automated assistant, the one or more settings of the computing device or one or more of the additional computing devices to be changed from the current state to the updated state.

13. The method of claim 12, wherein each of the one or more tailored container graphical elements include a graphical icon for representing the current state of the one or more settings.

14. The method of claim 12, further comprising:
causing, in response to receiving the portion of the request, the display interface of the computing device to visually render natural language content that characterizes the portion of the request,
wherein the one or more tailored graphical container elements are rendered simultaneous to the display interface rendering the natural language content.

15. The method of claim 12, wherein the portion of the request does not include the current state of the one or more settings.

16. The method of claim 12, wherein causing, based on the tailored container graphical element data, the display interface of the computing device to render the one or more tailored container graphical elements that indicate the current state of the one or more settings comprises:
causing a first tailored container graphical element, of the one or more tailored container graphical elements, to be rendered that indicates a first setting, of the one or more settings, of a first computing device, of the one or more additional computing devices, that is separate from the computing device; and
causing a second tailored container graphical element, of the one or more tailored container graphical elements, to be rendered that indicates a second setting, of the one or more settings, of a second computing device, of the one or more additional computing devices, that is separate from the computing device.

17. The method of claim 16,
wherein the first setting of the first computing device corresponds to a volume setting of the first computing device, and
wherein the second setting of the second computing device corresponds to a volume setting of the second computing device.

18. The method of claim 16,
wherein the first setting of the first computing device corresponds to a brightness setting of the first computing device, and
wherein the second setting of the second computing device corresponds to a brightness setting of the second computing device.

19. The method of claim 12, further comprising:
determining, based on processing the portion of the request, that the user has paused in providing of the request,
wherein causing the display interface of the computing device to render the one or more tailored container graphical elements that indicate the current state of the one or more setting is in response to determining that the user has paused in providing of the request.

20. A method implemented by one or more processors, the method comprising:
receiving, at a computing device, a first portion of a request from a user that is included in a spoken utterance,
wherein the spoken utterance is directed to an automated assistant that is accessible via the computing device;
determining, based on processing the first portion of the request, the portion of the request includes a particular word or phrase associated with controlling the computing device or one or more additional computing devices in communication with the computing device, wherein processing the first portion of the request comprises processing, using a streaming automatic speech recognition (ASR) model, a stream of audio data to generate a first streaming transcription corresponding to first natural language content for the first portion of the request, and wherein determining the portion of the request includes the particular word or phrase is based on processing the first streaming transcription corresponding to the first natural language content for the first portion of the request;

causing, based on the first portion of the request including the particular word or phrase, a generic container graphical element to be rendered, along with the first streaming transcription corresponding to the first natural language content for the first portion of the request, at a display interface of the computing device, wherein the generic container graphical element can be dynamically adapted with any one of multiple disparate tailored container graphical elements, and wherein each of the multiple disparate tailored container graphical elements is associated with a corresponding intent determined based on processing the first portion of the spoken utterance;

receiving, at the computing device, a second portion of the request from the user that is also included in the spoken utterance or that is included in an additional spoken utterance that is received subsequent to the spoken utterance;

determining, based on processing the second portion of the request, that the request corresponds to a particular intent, of one or more candidate intents, for controlling the computing device or one or more of the additional computing device in communication with the computing device, wherein processing the second portion of the request comprises processing, using the streaming ASR model, the stream of audio data to generate a second streaming transcription corresponding second natural language content for the second portion of the request, and wherein determining that the request corresponds to the particular intent is based on processing the second streaming transcription corresponding the second natural language content for the second portion of the request; and causing, based on the particular intent, the generic container graphical element rendered at the display interface to be dynamically adapted with a particular tailored container graphical element, of the multiple disparate tailored container graphical elements.

* * * * *